United States Patent

Ratz

[15] 3,699,429
[45] Oct. 17, 1972

[54] A METHOD AND APPARATUS FOR TESTING GEOLOGICAL STRATA FOR IDENTIFICATION THEREOF

[72] Inventor: Walter Ratz, Gelsenkirchen, Germany

[73] Assignee: Bergwerksverband GmbH, Essen-Kray, Germany

[22] Filed: Aug. 13, 1970

[21] Appl. No.: 63,413

Related U.S. Application Data

[63] Continuation-in-part of Ser. No. 732,730, May 28, 1968, abandoned.

[52] U.S. Cl. ................................................... 324/5
[51] Int. Cl. ............................................. G01v 3/08
[58] Field of Search ........................ 324/3, 5–7, 61, 324/340 SC, 34 T, 34 PS, 34

[56] References Cited

UNITED STATES PATENTS 3,477,018  11/1969  Richardson et al. .......... 324/34
2,772,393  11/1956  Davis ................. 324/61 TI UX Primary Examiner—Gerard R. Strecker
Attorney—Malcolm W. Fraser

[57] ABSTRACT

This invention relates to a method and apparatus for testing geological strata by means of a measuring system comprising a high frequency oscillatory circuit having a radiator cooperating with the test material to form a measuring capacitor influencing the resonant frequency and resonant voltage of the oscillatory circuit, the effects of a changing air gap between the radiator and the test material being taken into account.

3 Claims, 3 Drawing Figures

PATENTED OCT 17 1972 3,699,429

LEGEND

CHARACTERISTIC ENVELOPES OF PEAK RESONANT VOLTAGE VS RESONANT FREQUENCY WITH VARYING AIR GAP —

I. FOR COAL STRATA
II. FOR ROCK STRATA

INVENTOR
WALTER RÄTZ

BY *Malcolm W. Fraser*

ATTORNEY

A METHOD AND APPARATUS FOR TESTING GEOLOGICAL STRATA FOR IDENTIFICATION THEREOF

This application is a continuation-in-part of my copending application Ser. No. 732,730 filed May 28, 1968, entitled Method and Apparatus For Testing Geological Strata (now abandoned).

BACKGROUND OF THE INVENTION

1. Field of the Invention

The identification and possible measurement of thickness of different geological strata is a function which is essential in coal mining for the purpose of controlling the extraction machinery, including drilling equipment which has to be so controlled as to work a given seam. The measuring systems used in this context are extended on the one hand to avoid the increased wear on the extraction tools which arises with undesired deviation from the seam, and on the other hand to prevent the extraction machinery from digging out ores or minerals other than those which the mine is actually exploiting.

2. Prior Art

It is known in this context to use measuring systems which employ radioactive isotopes. Systems of this kind are disadvantageous on the one hand because they consume too much time in providing the desired measurement, and on the other hand because too much outlay is required to protect personnel and equipment against the effects of radiation.

Also known are measuring systems which exploit the differences in hardnesses of rock and of coal in order to provide a measurement. This presupposes that there will be clearly defined differences in hardness at the interfaces. This supposition is generally not adequately justified by the majority of deposits. In addition, the wear to which the actual measuring tools are subjected is very high, and this gives rise to further problems.

It is also known to use a measuring system employing a high frequency oscillatory circuit the radiators associated with which are moved over the stratum or seam, and in which the changes in resonance frequency and resonance voltage arising from the dielectric and electric properties of the various geological strata, can be determined by measurement. In accordance with this measuring technique, measuring systems can be constructed which avoid the afore-mentioned difficulties and drawbacks because they operate on a purely electrical basis. These measuring systems are based on the fact that the values of the loss angle and the dielectric constant for coal and rock, respectively, differ from one another to a measurable extent. The expressions coal and rock are accordingly used herein to refer to all geological strata which differ from one another measurably in this way.

As is well know, a high frequency oscillatory circuit contains not only an inductive element and a loss-inducing element in the form of an ohmic resistance, but also a capacitive impedance which is determined by the radiator. The radiator, in conjunction with a particular closely adjacent geological stratum, forms a measuring capacitor. A change in the capacitance in the oscillatory circuit, as a consequence of a change in the nature of the geological stratum, leads to a change in resonance frequency so that the particular resonance voltage enables the stratum to be identified.

It is a drawback of the known measuring systems of this kind that they cannot exclude the influence of an air gap between the radiator of the high frequency oscillatory circuit and the stratum which is to be identified. On the other hand, it is impossible to operate extraction machinery in mining in such a fashion that the radiator is continuously maintained directly over the seam. The consequently varying air gap, produced between the radiator and the seam, leads to considerable distortion of the measured values, in fact to such an extent that, until the present invention, measuring systems of this kind that they cannot exclude the influence of an air gap between the radiator of the high frequency oscillatory circuit and the stratum which is to be identified. On the other hand, it is impossible to operate extraction machinery in mining in such a fashion that the radiator is continuously maintained directly over the seam. The consequently varying air gap, produced between the radiator and the seam, leads to considerable distortion of the measured values, in fact to such an extent that, until the present invention, measuring systems of this kind have been unsuitable for practical application.

SUMMARY OF THE INVENTION

In accordance with the fundamental principle of the invention, this is achieved by virtue of the fact that, in order to identify the geological stratum, not only the resonant voltage but also the particular resonant frequency are determined for various air gap spacings between the radiator and the stratum being identified to determine the coordinates of a characteristic curve which represents the relationship between peak resonant voltage and resonant frequency, for the particular stratum, over a range of air gap spacings between radiator and stratum.

It is not difficult to see that as the radiator of the high frequency oscillatory circuit approaches a given stratum, because of the latter's higher dielectric constant (relative to that of air) there is a displacement in the resonant frequency towards lower frequencies. At the same time, because of the higher attenuation produced by the material being measured, the amplitude of the peak resonant voltage falls off. The resonant voltage could at this point be measured in the conventional way using a capacitor, a diode and a decoupling resistor. However, it would not be sufficient simply to measure the effect of the loss angle of the geological stratum, since this also depends upon the distance between the stratum and the measuring capacitor so that, considering coal and rock, the same loss angles would be obtained for difference respective air gaps between the radiator and the stratum.

The same measuring error also rises when the dielectric constant of the measuring capacitor, formed between radiator and geological stratum, is exclusively measured (by measuring the resonant frequency of the high frequency oscillatory circuit). In this case too, moving the radiator away from the stratum, the same apparent dielectric constant would be obtained with different materials dependent on the particular air gap between the radiator and the stratum being analyzed.

Where the invention is concerned, on the other hand, first of all the characteristic curves defining the relationship between peak resonant voltages and corresponding resonant frequencies over a span of air gap spacings is determined for each of the strata, these characteristic curves for coal and rock, for example, being respectively unique. By plotting the peak voltage values of the resonance curves measured as the corresponding resonant frequencies therefore, characteristic curves are obtained which correspond to the known characteristic curve of a particular material so that, as a result, independently of the particular air gap spacing between radiator and stratum, the particular material of the stratum can be identified.

FURTHER FEATURES OF THE INVENTION

In a practical embodiment of the invention, in order to determine the resonant frequency change, a known kind of trimming circuit is employed, in which a trimming voltage is derived from a frequency discriminator and with the peak resonant voltage, serves to identify the strata being analyzed. This embodiment may, for example, be practiced in such a fashion that the trimming voltage is set to zero for rock, so that any deflection on the measuring instrument indicates the presence of an adjoining coal seam.

OBJECTS OF THE INVENTION

It is an object of the present invention to provide a new and novel method for identifying the material content of geological strata.

Another object of the present invention is to provide a new and novel system for generating characteristic curves identifying geological strata proximate thereto.

These and other objects of the invention will become more fully apparent with reference to the following specification and drawings which relate to a preferred embodiment of the invention.

BRIEF DESCRIPTION OF THE DRAWINGS

The invention will be explained in more detail making reference to the accompanying drawing, in which.

DESCRIPTION OF THE PREFERRED EMBODIMENTS

Figure 1:
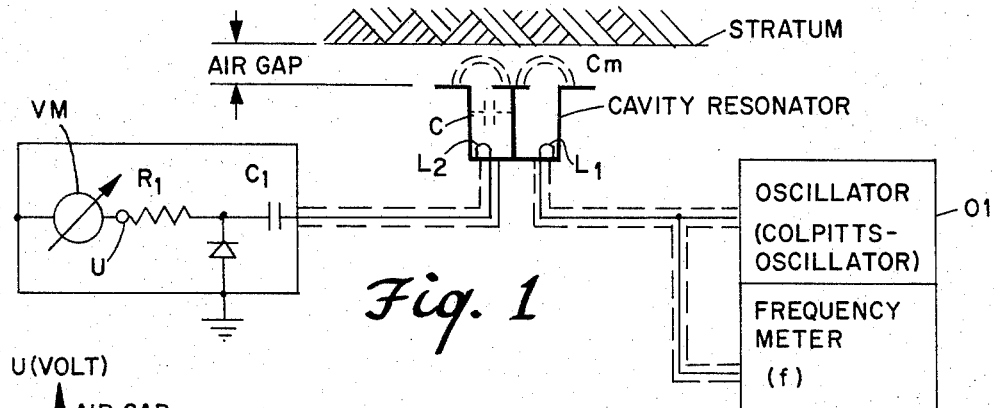
FIG. 1 schematically illustrates a high frequency oscillatory circuit for explaining the principle of measurement of the measuring system in accordance with the invention.

In FIG. 1, a high frequency oscillatory circuit has been illustrated. The actual oscillatory circuit is marked C and $L_2$, whilst $C_m$ is the measuring capacitor fact comprising a signal radiator positioned adjacent the geological stratum under analysis. The oscillatory circuit is excited to resonance through coil $L_1$. As the radiator $C_m$ approaches the stratum which is to be identified, i.e., as the air gap between the radiator $C_m$ and the stratum is decreased, due to the higher dielectric constant thereof (relative to air), a shift in resonant frequency towards lower frequency values takes place. At the same time, because of the higher attenuation produced by the material of the geological stratum, the amplitude of the resonant voltage falls off. The peak value of resonant voltage U relative to ground is measured across a capacitor $C_1$, a diode $D_1$ and a decoupling resistor $R_1$, and indicated by a voltmeter VM.

Figure 2:
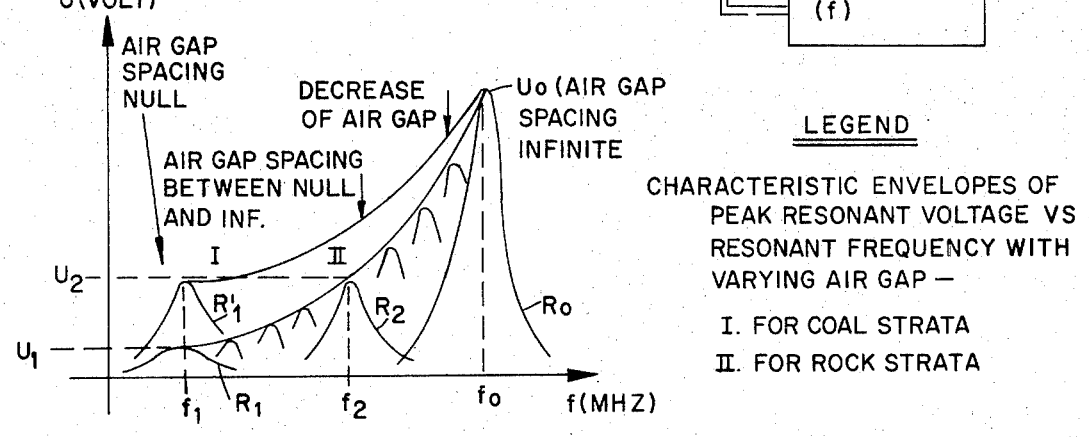
FIG. 2 is a diagram reproducing the aforementioned characteristic resonance envelope curves for coal and rock.

FIG. 2 illustrates the resonance characteristics of the oscillatory circuit, with the radiator $C_m$ applied to test coal and rock respectively. These curves are schematic illustrations and not intended to possess quantitative accuracy.

Referring to FIG. 2, resonant voltage vs. frequency curves $R_0$, $R_1$, $R'$ and $R_2$ are illustrated for explanatory purposes, the curve $R_0$ being that for the oscillatory circuit L2-C with the radiator not in proximity to a geological stratum, i.e., simply projecting a signal into the free air space. Naturally, due to the low attenuation of the air, the peak resonant voltage $U_0$ is highest at the resonant frequency $f_0$. If the radiator is now moved towards a rock seam of specific material, i.e., as the air gap between the radiator $C_m$ and the stratum is decreased, then at the frequency $f_2$ for example, the resonance curve $R_2$ including the peak resonant voltage $U_2$, is obtained. If the radiator is now moved close to a coal seam surface, i.e., the air gap is decreased until the previously mentioned peak resonant voltage $U_2$ is obtained, then it will be found that this voltage $U_2$ corresponds to the resonant frequency $f_1$ of resonance curve $R'_1$. If the radiator is moved to a certain distance away from the rock seam, i.e., the air gap is increased and the frequency $f_1$ maintained, then the resonance curve $R_1$ for the associated resonant frequency $f_1$ and peak resonant voltage $U_1$, will be obtained.

The diagram clearly shows that in each case, independently of the material involved, either the same peak resonant voltage values or the same resonant frequency values can be obtained, for different air gap spacings between the radiator $C_m$ and the surface of the stratum being analyzed.

Joining all the resonant voltage peaks corresponding to different air gap spacings between the radiator $C_m$ and known coal and rock strata generates a characteristic envelope curve I for coal strata and characteristic envelope curve II for rock strata as a function of varying air gap between such strata and the radiator $C_m$.

Figure 3:
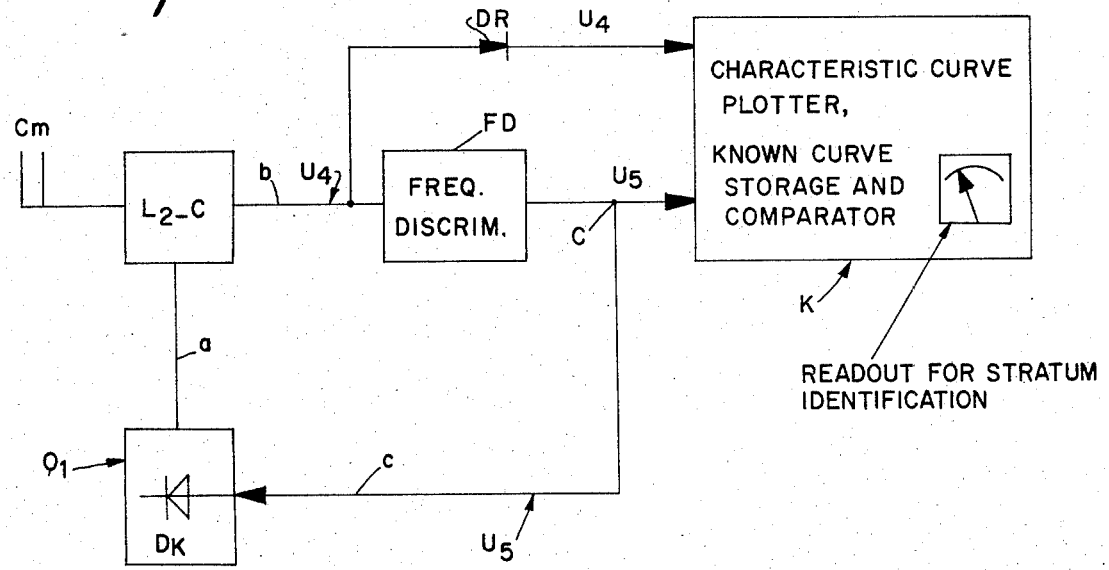
FIG. 3 is a preferred embodiment of the measuring system of the invention.

A practical embodiment of the measuring system has been illustrated in FIG. 3.

The radiator $C_m$ is connected with the resonant circuit L2-C and serves to vary the tuning and thus, the resonant frequency thereof as a function of the characteristics of the particular strata adjacent thereto.

The resonant circuit L2-C, being part of the cavity resonator assembly comprising the radiator $C_m$, is driven by the variable frequency oscillator $O_1$ through the circuit connection $a$.

The variable frequency oscillator circuit $O_1$ is controlled by means of a voltage variable capacitance diode $D_k$, the latter being varied by a control voltage $U_s$ generated at the circuit node $c$, the output terminal of a frequency discriminator circuit FD.

The frequency discriminator FD, in turn, receives the resonant voltage signal $U_4$ from the resonant circuit L2-C via the circuit node $b$ and operates on that signal to generate the control or trimming voltage $U_s$ as a proportional function of the frequency $f$ of the resonant voltage signal $U_4$.

In a manner well known in the art, the frequency of the oscillator $O_1$ can be constrained by the diode DK and the trimming voltage $U_5$ to follow the resonant frequency of the resonant circuit L2-C. The frequency discriminator FD and diode DK thus comprise a trimming circuit of a type well known in the art.

Thus, the level of the trimming voltage $U_5$ is a direct function of the resonant frequency of the resonant circuit L2-C at any given time and varies as a direct function of the variation in that frequency effected by varying the air gap between the radiator $C_m$ and the stratum under analysis.

In order that both these parameters can be evaluated in determining the nature of the material, i.e., the parameters of peak resonant voltage and frequency change, thus making it possible to decide what material the seam contains, any suitable characteristic curve plotter, known curve storage and comparator computer circuit K is employed in which the voltages $U_4$ and $U_5$ respectively occurring at points $b$ and $c$ are compared with one another such that the difference in magnitude between them can be used to determine the nature of the material. The voltage $U_4$ is rectified by the diode DR to render it compatible with the trimming voltage $U_5$ prior to its application to the comparator K.

The magnitude of the peak value of resonant voltage $U_4$ across the circuit L2-C varies directly as the known variation of resonant voltage with air gap spacing, defined by the same known characteristic curve for the particular material comprising the stratum adjacent to the radiator $C_m$.

Accordingly, by comparing the trimming voltage $U_5$ (which is a function of resonant frequency) to the peak value of the resonance voltage $U_4$ as the air gap spacing is decreasing between the radiator $C_m$ and the particular material adjacent thereto, such as at intervals of one centimeter of displacement, a characteristic envelope curve of resonant frequency vs. resonant voltage with varying air gap will be obtained in the computer K that will identify the particular material in the unknown stratum adjacent the radiator $C_m$.

The computer K, preferably contains a curve plotter, a memory of known characteristic curves of known strata and a comparator circuit for indicating similarity between the characteristic curve of the unknown stratum under analysis and one of those of the known strata contained in the memory. A suitable readout is provided in the comparator circuit to indicate the identity of the stratum under analysis.

Such curve plotting, memory and comparison devices and their interrelated functions are well known in the art.

It is obvious that the measurement may also be effected in a quantitative manner and that the system can be incorporated into any kind of extraction machinery control system in order to measure a controlled quantity for the purposes of appropriately controlling the extraction tools.

I claim:

1. A method of testing geological strata for identification thereof, comprising the steps of:
   producing a high frequency signal by use of an oscillatory circuit said oscillatory circuit including a signal radiator;
   establishing a capacitative relationship between said signal radiator and a stratum of test material in order to influence the resonant voltage and resonant frequency of the oscillatory circuit by positioning said signal radiator adjacent said stratum;
   moving said radiator toward said stratum and measuring the magnitudes of the peak resonant voltages and corresponding resonant frequencies of the oscillatory circuit for each of a plurality of discrete air gap spacings between the signal radiator and the test material, for said particular stratum; said magnitudes being varied by the change in capacitance between said radiator and said stratum;
   deriving a characteristic curve of peak resonant voltage versus resonant frequency for said stratum over said plurality of discrete air gap spacings; and
   comparing said characteristic curve with like known characteristic curves of known strata of materials to thereby identify the particular test material.

2. Apparatus for identifying geological strata, comprising:
   a resonant circuit means including a signal radiator selectively movable towards and away from an unknown geological stratum to establish a variable capacitance therewith as a function of the air gap therebetween;
   oscillator means connected to drive said resonant circuit means;
   said resonant circuit means providing a peak resonant output voltage and corresponding resonant frequency for each of a plurality of selected air gap spacings between said radiator and said unknown stratum;
   said peak resonant voltages and resonant frequencies defining the coordinates a characteristic curve peculiar to that stratum of the resonant frequencies vs. peak resonant voltage over a given range of air gap spacings between said radiator and said unknown stratum;
   computer means responsive to said peak resonant voltages and resonant frequencies for plotting said characteristic curve of said unknown stratum;
   said computer means including trimmer circuit means detecting said resonant frequency of said resonant circuit means, providing a trimming voltage proportional thereto, and applying said trimming voltage to said oscillator means to constrain the output frequency thereof to said resonant frequency at a given air gap spacing;
   said resonant frequency and peak resonant voltage at a plurality of air gap spacings over said range thereby defining the coordinates of said characteristic curve of said unknown stratum; and
   means responsive to said peak resonant and trimming voltages for plotting said characteristic curve.

3. Apparatus for identifying geological strata, comprising:
   a resonant circuit means including a signal radiator selectively movable towards and away from an unknown geological stratum to establish a variable capacitance therewith as a function of the air gap therebetween;
   oscillator means connected to drive said resonant circuit means;

said resonant circuit means providing a peak resonant output voltage and corresponding resonant frequency for each of a plurality of selected air gap spacings between said radiator and said unknown stratum;

said peak resonant voltages and resonant frequencies defining the coordinates a characteristic curve peculiar to that stratum of the resonant frequencies vs. peak resonant voltage over a given range of air gap spacings between said radiator and said unknown stratum;

computer means responsive to said peak resonant voltages and resonant frequencies for plotting said characteristic curve of said unknown stratum;

said computer means including trimmer circuit means detecting said resonant frequency of said resonant circuit means, providing a trimming voltage proportional thereto, and applying said trimming voltage to said oscillator means to constrain the output frequency thereof to said resonant frequency at a given air gap spacing;

said resonant frequency and peak resonant voltage at a plurality of air gap spacings over said range thereby defining the coordinates of said characteristic curve of said unknown stratum;

means responsive to said peak resonant and trimming voltages for plotting said characteristic curve;

a memory of a plurality of like characteristic curves for strata of known identification; and comparison means for determining similarity between said characteristic curve of said unknown stratum and one of said curves of said known strata to thereby identify said unknown stratum.

* * * * *